Oct. 16, 1951   L. JONES   2,571,722
TORPEDO DEPTH CONTROL GEAR
Filed April 26, 1947   2 SHEETS—SHEET 1

FIG.I.

Inventor
LEWIS JONES, DECEASED
WILLIAM THOMAS WILKINSON, Administrator
By
Harrison, Lake & Co.
AGENTS

UNITED STATES PATENT OFFICE 2,571,722

TORPEDO DEPTH CONTROL GEAR

Lewis Jones, deceased, late of Upwey, Weymouth, England, by William Thomas Wilkinson, executor, Wimbledon, England, assignor to Vickers-Armstrongs Limited, London, England, a company of Great Britain Application April 26, 1947, Serial No. 744,262
In Great Britain April 10, 1942

Section 1, Public Law 690, August 8, 1946
Patent expires April 10, 1962

4 Claims. (Cl. 114—25)

This invention relates to torpedo depth control gear of the kind including a spring urged plate and an associated diaphragm which is acted upon by the pressure of sea water in a compartment open to the sea, and a pendulum, both plate and pendulum being connected with the valve controlling the steering engine. It has hitherto usually been the practice to connect the pendulum and plate together in a rigid manner, the pendulum being thus connected with the steering engine by way of the plate. This arrangement has the disadvantage that the pendulum had to overcome the pressure exerted by the sea water on the diaphragm over the whole area of the plate in order to bring the steering engine into operation.

According to the present invention the pendulum instead of normally acting on the plate, acts indirectly on the diaphragm itself, but over an area of the diaphragm very much smaller than that of the plate.

In this way the sensitivity of the pendulum mechanism employed for correcting angular inclination of the torpedo in a vertical plane is greatly improved.

Further features of the invention are the provision of means for limiting angular movement of the pendulum when the torpedo is at a relatively great depth, the control obtainable by the pendulum being thus limited to that necessary to prevent the torpedo assuming too steep an angle, any permitted but unusual angular movement of the pendulum, as a result of acceleration of the torpedo, having to be transmitted to the diaphragm and steering engine by way of the plate, and against the pressure exerted by the sea water over the whole of the plate's area.

In order that the said invention may be clearly understood and readily carried into effect, the same will now be described more fully with reference to the accompanying drawings, wherein—

Figure 1:
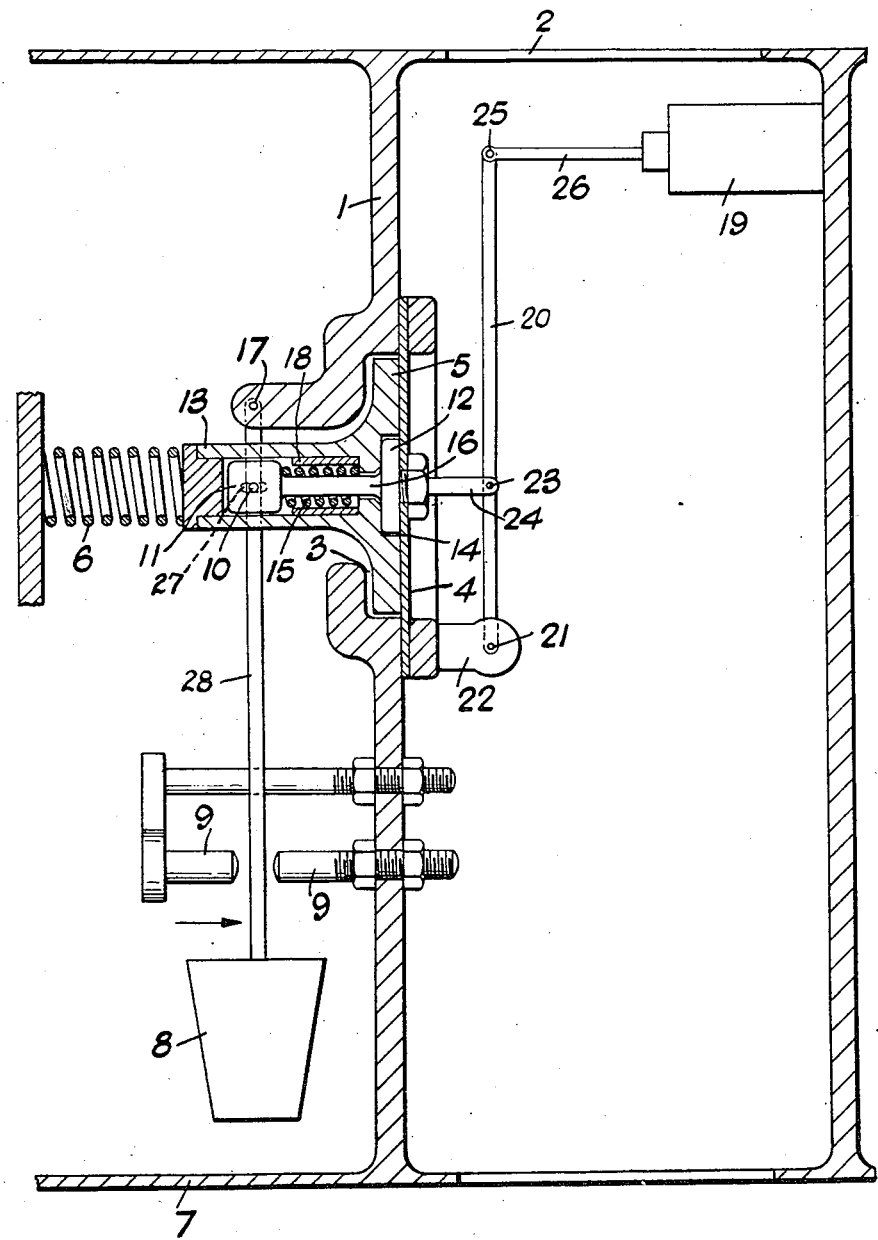
Figure 2:
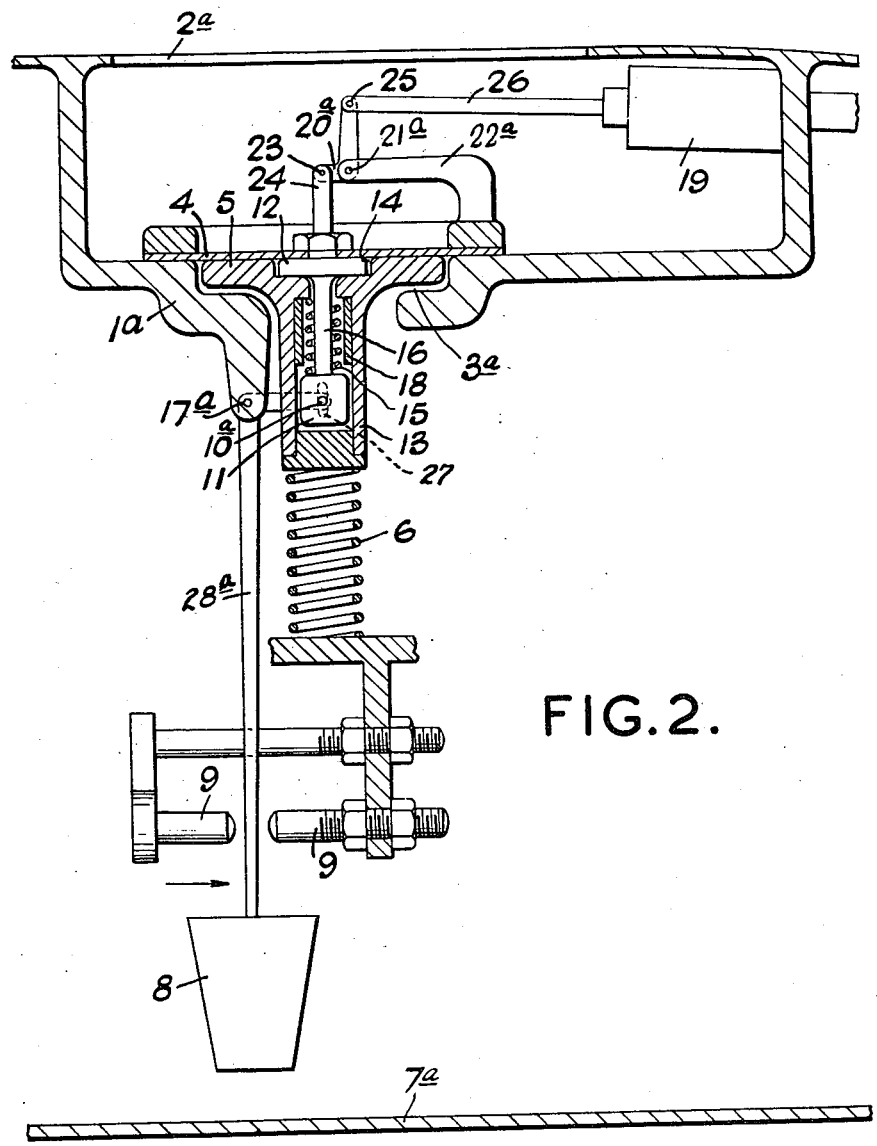

Figure 1 illustrates diagrammatically the component parts of the depth control gear fitted to a chamber bulkhead of a torpedo, and Figure 2 is a similar view illustrating the component parts fitted to a pocket seating.

In the construction illustrated by Figure 1 one of the bulkheads 1 forming the pressure chamber or compartment, which chamber is open to the sea, as at 2, has an opening or pocket 3 which is closed on the chamber side by a diaphragm 4 and which contains a plate 5 which latter is urged into contact with the diaphragm under the action of an associated spring 6, the spring being adjustable so as to balance the water pressure exerted on the diaphragm when the torpedo is immersed to the depth at which the torpedo is to run.

The shell 7 of the torpedo contains a suspended pendulum in the form of a lever arm 8′ and a weight 8 mounted on a pendulum arm 28, the arm 8 being arranged near its weighted free end to swing between two stops 9, the pendulum arm being connected at a point 10 intermediate its length, to a member 11 rigidly connected to an inner plate 12, the member 11 being slidably mounted within a tubular extension 13 of the main plate and permitting relative movement between member 11 and plate 12 and main plate 5 in the after direction only, the inner plate 12 being located within a recess 14 in the main plate 5 adjacent the diaphragm, the inner plate being attached to the diaphragm at or near its centre, the outer face of the inner plate lying flush with the surface of the main plate. A coil spring 15 surrounds the shank 16 connecting parts 11 and 12 which spring serves to hold the inner plate in a position in which it does not exert pressure on the diaphragm, endwise movement of the inner plate, however, against the action of the spring, as a result of angular movement of the pendulum arm 28 in the direction of the arrow about its pivotal point 17 resulting in a displacement of the central part of the diaphragm against the pressure of the sea water in the chamber, the pressure of the water which it is necessary to overcome, however, being only that applied to the area of the diaphragm in contact with the inner plate which is of relatively small diameter compared with that of the main plate.

A sleeve-like stop 18 surrounds the coil spring 15, which stop comes into operation in a manner described hereinafter. If the torpedo is deeper by a considerable amount than the depth set by the tension on the controlling spring, the diaphragm, together with the inner and outer plates, will be displaced under the increased water pressure and the pendulum will be moved against the forward stop. At the same time, the steering engine 19 will be operated by the linkage system as hereinafter described to give extreme up rudder.

The inner plate 12 is connected by means of a mechanical lever or link mechanism or other means with the steering engine, and in this way the pendulum is connected with the steering engine by way of the inner plate the latter member also acting as an intermediary between the main plate and the engine in the one direction positively and in the other direction by the amount of tension in the spring 15. In the construction shown a lever 20 is pivoted at 21 to a member 22 on the bulkhead 1 and is pivotally connected at the point 23 intermediate its length to an extension 24 of the inner plate, the lever being also pivotally connected at 25 at its free end to a push-pull rod member 26 connected with the operating gear 19 of the steering engine.

In the arrangement shown by Figure 2 the bulk of the component parts correspond to those shown in Figure 1 and consequently they are indicated by the same reference characters. In the alternative arrangement, however, the parts are fitted to a pocket seating 1a formed with a pocket 3a and having an opening 2a in the torpedo shell 7a for admitting sea water and instead of the pendulum lever or arm 28a thereof being a straight arm, it is cranked or bent at its upper end and fulcrumed at its elbow, as at 17a, and at the extremity or free end of its upper horizontal limb pivotally connected, as at 10a, with the part 11.

The lever 20a, corresponding to the part 20 of the embodiment of Fig. 1, is bent or cranked intermediate its length and pivotally connected at its elbow, as at 21a, to the bent supporting part 22a. One end of the lever 20a is pivotally connected, as at 23, to the part 24, while the other end of the lever 20a is pivotally connected, as at 25, to the push-pull rod 26.

Operation of the gear illustrated by Figures 1 and 2 is as follows:

With the torpedo at the depth corresponding to equilibrium of water pressure on the diaphragm, and the pressure exerted by its associated spring, any inclination of the torpedo will be corrected as a result of angular movement of the pendulum 8, the pendulum slightly displacing the main plate 5 and its associated spring urged inner plate 12 and also the diaphragm 4, the steering engine 19 being thereby actuated through the medium of the connecting links or levers 20. Should the torpedo be deep or shallow, the spring 6 associated with the main plate will not balance the water pressure exerted on the diaphragm, and the plate with its associated spring urged inner plate will be forced to the left or downwardly in the case of Figure 2, against the action of the spring 6 associated with the main plate, or allowed to move in the opposite direction, thereby again acting on the valve of the steering engine through the medium of the levers or links.

If the torpedo for any reason is deeper by a considerable amount than the depth set by the tension of the spring 6, the diaphragm, together with main plate and spring urged inner plate, will be forced against the action of the spring 6 associated with the main plate and this movement will also be transmitted to the pendulum until the latter comes into contact with the forward stop. The levers or links will thus move the valve of the steering engine to give extreme up rudder and the torpedo will begin to turn nose upwards and rise. The turn nose up may assume too great an angle before it is checked, and the present invention is concerned with dealing with such a contingency. Assuming, therefore, that the torpedo is considerably below set depth and is turning nose upwards under full up helm, as soon as the torpedo reaches a certain angle nose up, the pendulum by compressing the spring 15 associated with the spring urged inner plate will force the latter in an endwise direction as far as the stop 18 surrounding the spring will permit, movement being thereby transmitted to the valve of the steering engine. In this way, the pendulum has only to overcome the tension of the spring associated with the spring urged inner plate, plus the water pressure over the area of its head, instead of the pressure on the area of the main plate. The area of the head of the spring urged inner plate relative to the area of the main plate and the pressure exerted by the spring associated with the inner plate are chosen so that as the torpedo angle approximates 9° to 12° (according to whether the depth error is less or more) the pendulum can take charge and stop the nose up turn of the torpedo.

The cylindrical stop member surrounding the spring associated with the inner plate in addition to acting as a stop serves to transmit movement of the pendulum to the main plate, and consequently should the pendulum be moved through a large angle as a result of acceleration, the inner plate at a point where the pendulum is attached will be moved into contact with the stop, any further endwise movement of the inner plate being only possible if the pendulum is capable of moving the main plate endwise as a whole and against the greater water pressure exerted over the plate area. If the cylindrical stop were not provided, extreme angular movement of the pendulum would be transmitted through corresponding movement of the inner plate and give down helm to the torpedo, but with the stop the pendulum to reach an extreme point in its travel must displace the main plate against the excessive water pressure.

What is claimed is:

1. Hydrostatically operated torpedo depth control gear comprising on the torpedo a compartment exposed for the free ingress of the ambient water, a flexible diaphragm exposed to the water pressure in said compartment, two concentric abutments with co-planar faces engaging one face of the diaphragm and isolated from the water in said compartment by the diaphragm, spring means urging the abutments in unison against the diaphragm so as to yieldingly oppose the water pressure on the diaphragm, a steering actuator, means controlling said actuator and operated by the displacements of the diaphragm, and load applying means operatively associated with said abutments and controlled by the inclination of the torpedo to effect operative displacement of one of said abutments relative to the other when the torpedo inclines out of its predetermined normal level to deform the diaphragm against the influence of water pressure over an area smaller than the area of diaphragm which is deformed by both of the said abutments to produce a torpedo inclination correcting actuation of the said steering actuator via the said means actuated by the displacements of the diaphragm.

2. In a torpedo, hydrostatically operated depth control gear comprising a compartment exposed to the free ingress of the ambient water and partitioned to isolate the remainder of the torpedo from direct ingress thereinto of the water from said compartment, an opening in part of said partitioning, a diaphragm sealed across said opening and exposed on one face to the water pressure in aid compartment, a plate engaging a predominating portion of the deformable area of the diaphragm on the face of the diaphragm remote from the said compartment, spring means maintaining said plate pressed against the diaphragm and yieldingly opposing displacement of the plate due to water pressure against the diaphragm, a steering engine, means actuated from and by the substantially axial displacements of the centre of the diaphragm controlling said steering engine, an auxiliary abutment member operating within and relatively to the said plate against the deformable part of the diaphragm not engaged by said plate and adapted to deform the diaphragm against the influence of the water pressure in said compartment to produce a correcting actuation on the said steering engine via the said means actuated by the substantially axial displacements of the centre of the diaphragm, a pendulum operatively connected to and adapted to load said auxiliary abutment effectively in the direction opposed to the water pressure on the diaphragm at predetermined inclination of the torpedo, and spring means yieldingly opposing actuation of said auxiliary abutment by said pendulum.

3. In a torpedo, hydrostatically operated depth control gear comprising a compartment exposed to the free ingress of the ambient water and partitioned to isolate the remainder of the torpedo from direct ingress thereinto of the water from said compartment, an opening in part of said partitioning, a diaphragm sealed across said opening and exposed on one face to the water pressure in said compartment, an annular abutment coaxial with the diaphragm and engaging a predominating portion of the deformable area of the diaphragm on the face of the diaphragm remote from the said compartment, spring means maintaining said annular abutment pressed against the diaphragm and yieldingly opposing axial displacement of the abutment due to the pressure of water against the diaphragm, a steering engine, means actuated from and by the substantially axial displacements of the centre of the diaphragm controlling said steering engine, an auxiliary abutment member operating within and relatively to the said annular abutment against the part of the diaphragm disposed concentrically within and not engaged by the annular abutment and adapted to deform the diaphragm against the influence of the water pressure in said compartment to produce a correcting actuation on the said steering engine via the said means actuated by the substantially axial displacements of the centre of the diaphragm, spring means between the annular abutment and auxiliary abutment operating to maintain both abutments in unitary effective engagement with the diaphragm, a weighted pendulum lever with a driving part remote from its weight operatively connected to said auxiliary abutment and adapted upon predetermined inclination of the torpedo to displace said auxiliary abutment and the diaphragm relatively to the annular abutment.

4. Torpedo depth control gear comprising a compartment in the torpedo open to the pressure of sea water, a diaphragm which is acted upon by the pressure of sea water in said compartment, a main plate engaging the diaphragm, spring controlling means operating against the diaphragm via said main plate and set to balance the water pressure exerted on said diaphragm when the torpedo is running at the appropriate depth, a steering engine, a pendulum, means controllably connecting the plate and pendulum to the steering engine, an inner plate having an area very much less than that of the main plate and located within a recess in the main plate, the inner plate acting on the centre of the diaphragm, a spring associated with said inner plate for maintaining said inner plate normally in a position in which its outer surface lies flush with the outer surface of the main plate and a stop member for limiting relative movement between said plates in the direction of the diaphragm, the controllable connection of the pendulum with the steering engine being through the medium of said inner plate, the arrangement being such that under normal water pressures the steering engine will be controlled by movement of the main and inner plate as a whole under the action of the said spring controlling means and/or the pendulum, but in the event of the force which the pendulum is capable of generating being insufficient to move the main plate against excessive water pressure, the pendulum, however, due to the relatively small effective area of the inner plate being capable of overcoming the relatively low water pressure applied thereto and consequently being capable of moving the inner plate and thus operating the valve of the steering engine to correct any excessive upward angular inclination of the torpedo.

WILLIAM THOMAS WILKINSON,
*Executor of the Last Will and Testament of Lewis Jones, Deceased.*

REFERENCES CITED

The following references are of record in the file of this patent:

UNITED STATES PATENTS

| Number | Name | Date |
| --- | --- | --- |
| 933,083 | Leavitt | Sept. 7, 1909 |